(12) United States Patent
Schmidt et al.

(10) Patent No.: US 7,373,818 B2
(45) Date of Patent: May 20, 2008

(54) FIXING SYSTEM FOR A MEASURING DEVICE FOR MONITORING AND/OR DETERMINATION OF A FILLING LEVEL

(75) Inventors: Robert Schmidt, Schopfheim (DE); Armin Wendler, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/542,801

(22) PCT Filed: Jan. 20, 2004

(86) PCT No.: PCT/EP2004/000418

§ 371 (c)(1),
(2), (4) Date: Apr. 17, 2006

(87) PCT Pub. No.: WO2004/065799

PCT Pub. Date: Aug. 5, 2004

(65) Prior Publication Data

US 2006/0243871 A1    Nov. 2, 2006

(51) Int. Cl.
*G01F 23/00* (2006.01)
(52) U.S. Cl. ............................................ 73/304 R
(58) Field of Classification Search .................. None
See application file for complete search history.

(56) References Cited

U.S. PATENT DOCUMENTS 3,864,974 A * 2/1975 Rauchwerger ............ 73/304 C
5,351,998 A    10/1994 Behrens

FOREIGN PATENT DOCUMENTS

| DE | 27 36 516 A1 | 2/1979 |
| DE | 3 843 450 | 6/1990 |
| DE | 93 10 561.4 | 12/1993 |
| DE | 4 038 539 | 10/1994 |
| DE | 692 07 365 T2 | 5/1996 |

* cited by examiner

*Primary Examiner*—Robert Raevis
(74) *Attorney, Agent, or Firm*—Bacon & Thomas, PLLC

(57) ABSTRACT

A securement system for a measuring device for monitoring and/or determining a fill level of a medium in a container, with at least one device housing and at least one elongated unit. In the device housing, at least one cutting ring is provided, which cuts into the outer layer of the end of the elongated unit far from the process in such a manner that the elongated unit is connected with the device housing electrically, pressure tightly and/or resistantly against pull.

7 Claims, 3 Drawing Sheets

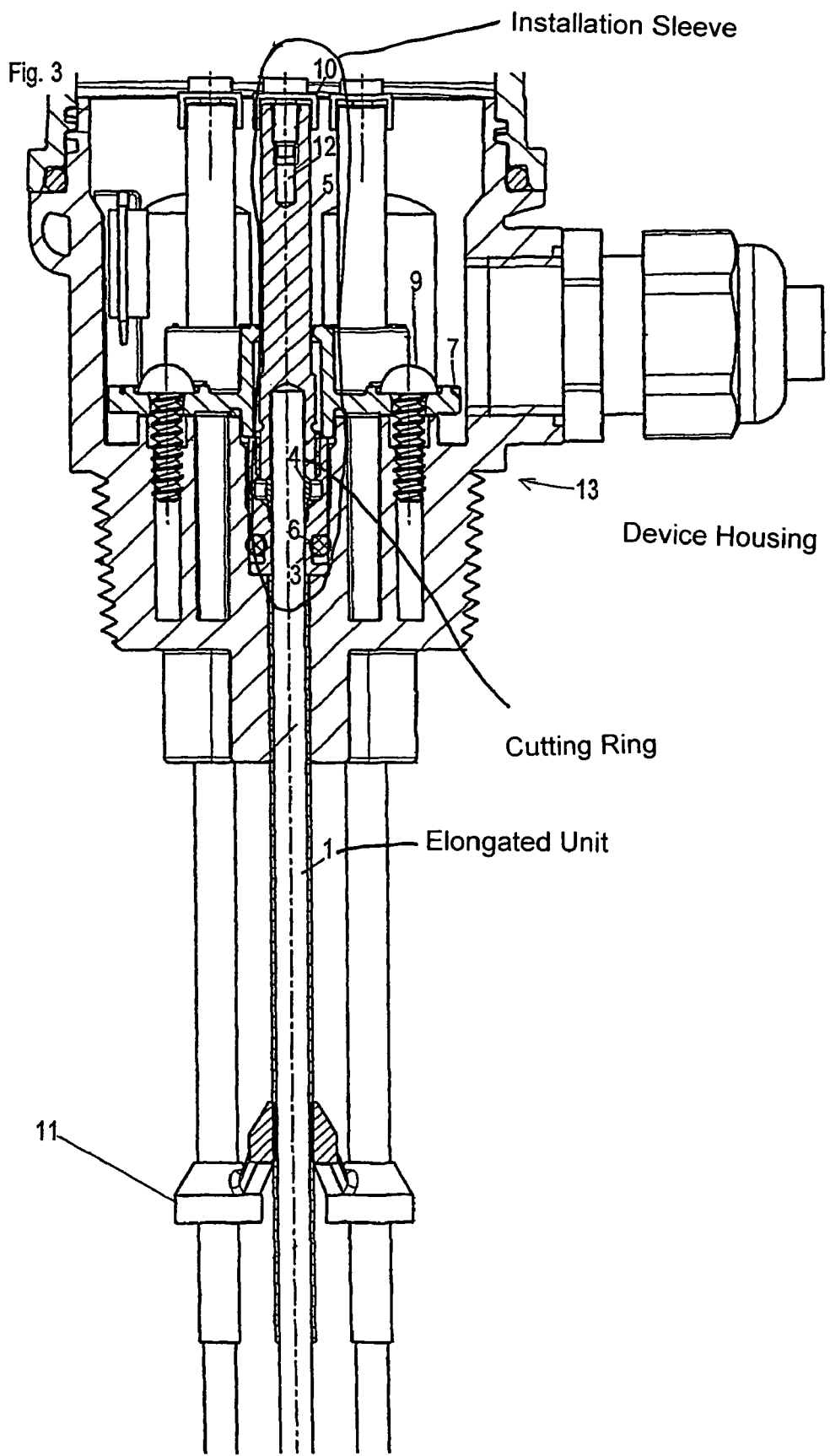

FIXING SYSTEM FOR A MEASURING DEVICE FOR MONITORING AND/OR DETERMINATION OF A FILLING LEVEL

FIELD OF THE INVENTION

The invention relates to a securement system for a measuring device for monitoring and/or determining the fill level of a medium in a container. The measuring device includes at least one device housing and at least one elongated unit.

BACKGROUND OF THE INVENTION

The assignee manufactures and sells various embodiments of measuring devices equipped with rope probes. These measuring devices usually include a device housing, in which a measuring device electronics is accommodated and on which a probe in rope, cable, tubular or rod form is mounted. These ropes, cables, tubes or rods are referred to herein generically as elongated units. Other common generic references include rope, or rope probes. Such elongated units are used e.g. in the capacitive measuring technology as an electrode, which is introduced into a container holding a medium. As a function of the fill level of the medium, the capacitance of the capacitor, of which one electrode is the elongated unit, changes, and, consequently, the fill level can be determined and/or monitored therefrom. In another method of measurement, e.g. electromagnetic pulses are sent along the elongated unit immersed in the medium. In this case, the elongated unit serves as a waveguide. From the signal reflected from the upper surface of the medium, the fill level can likewise be derived. Another application is represented e.g. by a conductive probe, in which case the electrical resistance of the medium is measured. Here, fill level is detected by the arrangement of multiple elongated units at different heights.

These measuring devices with an elongated unit are usually mounted to, or on, a container containing the medium to be measured, with the device housing frequently being secured in or on a container wall such that the elongated unit extends into the interior of the container and into the medium. The elongated units are either themselves conducting or else they at least have an electrical conductor inside. The elongated units are also, if necessary, coated externally with an electrically insulating layer. This layer provides protection against short-circuiting or e.g. also protection against aggressive media. Usually, the elongated units are connected with a measuring device electronics, in which the measurement signals are produced, or processed, as the case may be. The electronics, in turn, is usually connected with a measuring, or control, room, or with another superordinated unit, in which the fill level measured values are evaluated and processed.

A problem associated with these procedures is that the elongated units must be adapted to different conditions, i.e. they must be longer, or shorter, depending on the dimensions of the container. They must also, if necessary, be capable of being exchanged, when e.g. the medium attacks, or deteriorates, the elongated units. In such case, it should be possible that the elongated units can be replaced simply.

SUMMARY OF THE INVENTION

An object of the invention is to provide a securement system, by which the elongated unit can be secured to/in the device housing.

The object is achieved according to the invention by providing in the device housing at least one cutting ring, which cuts into the outer layer of the end of the elongated unit far from the process in such a way that the elongated unit is connected with the device housing electrically, pressure-tightly and/or resistantly to pull. Such cutting rings and their use for the connecting of pipelines are disclosed e.g. in German patent DE 40 38 539. The invention has the great advantage that it is very simple. Particularly of advantage is that no special demands are made concerning the character and form of the elongated unit, since the connection is enabled via the components. There is e.g. no screw-thread needed, in which contact corrosion could occur. An advantage is e.g. that the cutting ring also assumes a sealing function. The cutting rings are, moreover, standardized manufacturing pieces (DIN 2353, or DIN EN ISO 8434-1, depending on the circumstances), which are, consequently, very cost-favorable and simple. Furthermore, electrical connection is also enabled thereby. Depending on embodiment, the cutting ring can also break through an insulating layer on the outer surface of the elongated unit. In such case, it can be of advantage that this insulating layer is only broken through where it must be broken through for the electrical contact. This happens during the securement of the elongated unit, as a result of the process of securement. Consequently, no complicated calculations need to be done for the dimensioning of the relevant section which is to be freed of insulation or for related, fine adjustments. The possibility is, however, available, that, as a preparatory step, the insulation is removed over a certain range, or at least made sufficiently thin, and that then the cutting ring enables a very good electrical contact with the elongated unit. In total, for exchanging the elongated element, only the elongated unit itself and the cutting ring need to be renewed, or replaced, as the case may be. Above all, this can be performed at the location of use and by the customer.

An idea of the invention is, thus, that the cutting ring is secured on the elongated unit. Since the cutting ring is located in the device housing, the elongated unit can not e.g. be pulled out of the device housing. In such case, the device housing can also be embodied such that it so accommodates the cutting ring e.g. in a recess, that also a sealing function is assumed by the cutting ring. Consequently, e.g. a gap-free embodiment is enabled, such as is required e.g. in the foods industry. A great advantage also lies in the fact that the cutting ring produces a good electrical contact with the elongated unit. Compared with e.g. a screw-threaded embodiment in which the elongated unit would be screwed into the device housing, the invention also offers the advantage that the elongated unit cannot be unscrewed by rotary movements, such as can be evoked e.g. by a stirring device in the container.

BRIEF DESCRIPTION OF THE DRAWINGS

The invention will now be explained in greater detail on the basis of the appended drawings, the figures of which show as follows:

FIG. 3 a section through the device housing with installed, elongated units.

DESCRIPTION OF THE PREFERRED EMBODIMENTS

Figure 1:
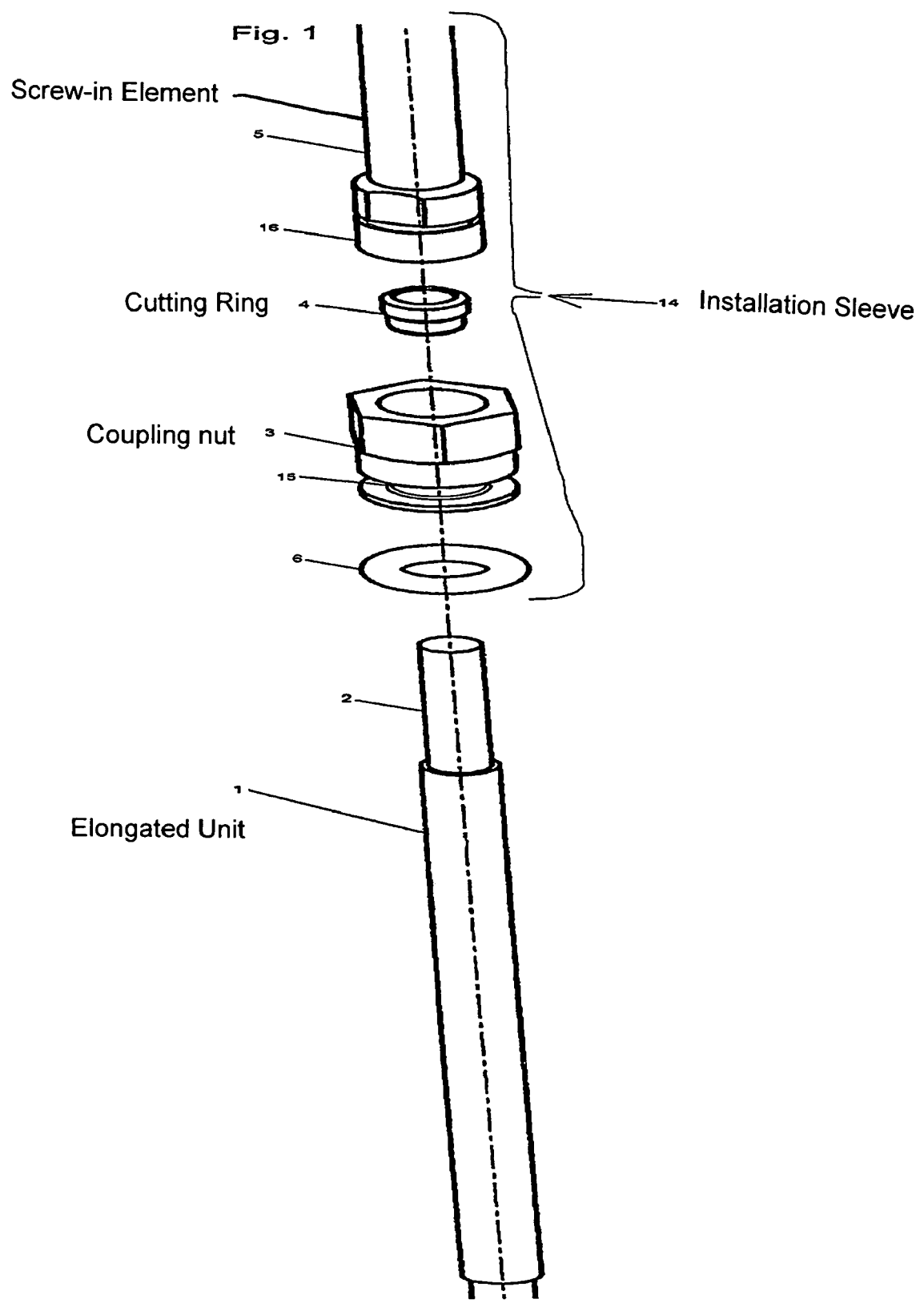
FIG. 1 an exploded illustration of an elongated unit and the securement system.

An advantageous embodiment provides that the diameter of the elongated unit is smaller than its length. Furthermore, an embodiment includes that the elongated unit is a rope, a cable, a rod or a tube. Consequently, the generic meaning of a rope, or rope probe, is covered. Usually, the diameter lies in the millimeter range, with the length being in the meter range.

An advantageous embodiment provides that an installation sleeve is provided in the device housing, surrounding the cutting ring and a section of the elongated unit. The installation sleeve can serve for the encapsulation of the end of the elongated unit located in the device housing. In this way, a greater protection is provided for the device. This embodiment thus goes beyond the embodiment wherein the cutting ring is accommodated directly in the device housing.

In an advantageous embodiment, a coupling nut is provided, which surrounds the cutting ring and closes the installation sleeve in the direction of the process. Thus, if the elongated unit experiences a pull on the process side, the cutting ring is blocked by the coupling nut. Furthermore, the coupling nut offers a sealing against the medium.

An advantageous embodiment includes that a recess is provided in the coupling nut, for accommodating an O-ring for sealing. This O-ring prevents movement of the medium over the outside of the coupling nut e.g. into the device housing.

An advantageous embodiment is characterized in that, in the installation sleeve, a screw-in element is provided, which is fashioned such that it accommodates part of the elongated unit. An advantageous embodiment provides that the screw-in element and the coupling nut are formed and arranged such that they are connected releasably with one another. In this way, also, in this case, a safe and tight connection can be effected. In such case, it can be provided, e.g., that the screw-in element has a section, which has a smaller diameter than the coupling nut. Because of this section, the coupling nut is the closure of the installation sleeve in the direction of the process. Additionally, this provides a greater stability of the installation sleeve. Likewise, this also provides a further protection of the device against penetration by the medium, since the installation sleeve is also sealed in the direction facing away from the process, i.e. via the installation sleeve, the end of the elongated unit facing away from the process is, in effect, encapsulated. Thus, if the medium penetrates via the elongated unit into the installation housing, the medium still cannot get into the housing by way of this route. Additionally, the O-ring on the coupling nut seals the access for the region between coupling nut and device housing.

An advantageous embodiment includes that the screw-in element is fashioned such that it is elastically connected with the cutting ring. By the cutting ring, the electrical contact with the elongated unit is produced; the contact is then furthered via the screw-in element. For this case, an insulating layer can also be provided on the outside of the screw-in element.

An advantageous embodiment includes that a holding element is provided in the device housing. At least one elongated unit is secured in the holding element. This permits the design of the installation sleeve, thus, to be fitted into the device housing as effectively as possible. By the fitting embodiment of the device housing, the holding element can be secured as optimally and safely as possible. Furthermore, it can be effected that a pressure, which arises from the securement, acts only on the coupling nut. Moreover, by suitable embodiments of the holding element, such as e.g. injected seals, a plurality of elongated units electrically insulated from one another can be included.

FIG. 1 shows an elongated unit 1, which, in this example, has a smaller diameter in a section 2 far from the process. This can arise e.g. on the basis of an insulating layer, which has a lesser thickness, or which has been removed, at this section 2. The coupling nut 3 is placed on the section 2. The cutting ring 4 comes into the coupling nut 3. Thereover is located the screw-in element 5. The coupling nut 3 has a recess 15, which permits the securement of an O-ring 6 for sealing. The screw-in element 5 is inserted by way of section 16 into the coupling nut 3 and screwed-in there, if a threaded engagement is provided. Consequently, the screw-in element 5 and the coupling nut 3 form the installation sleeve 14.

Figure 2:
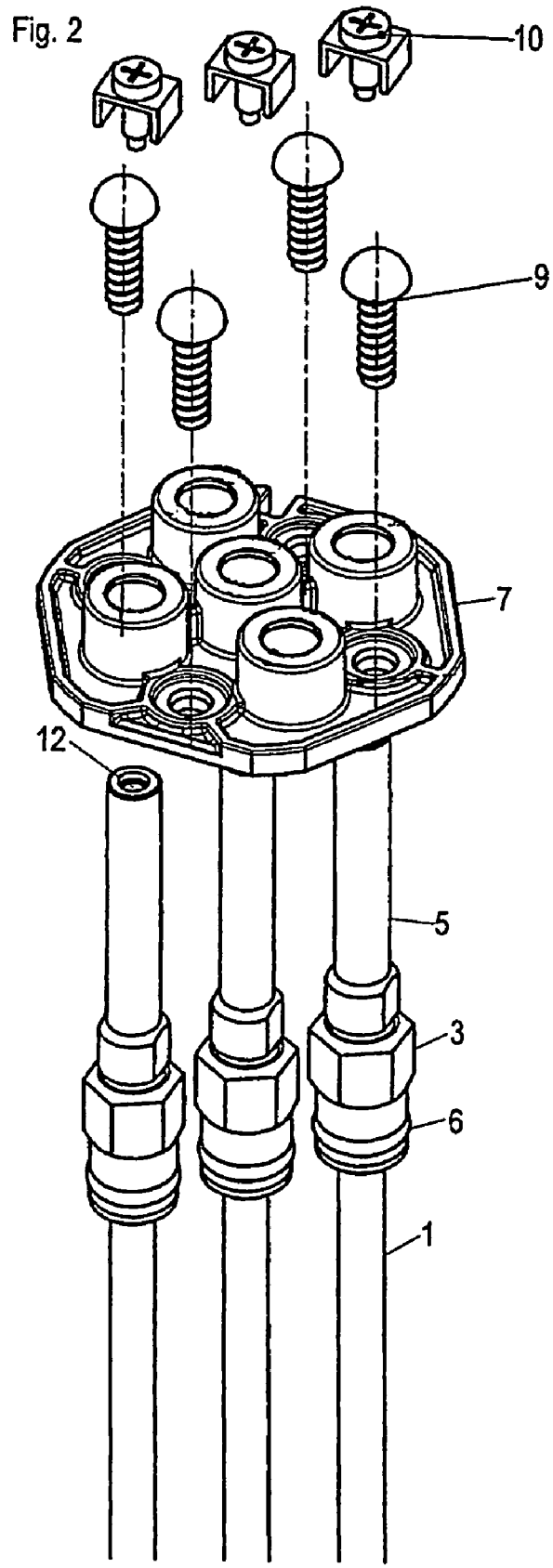
FIG. 2 the holding element and elongated units in an exploded illustration.

FIG. 2 shows the holding element 7. It assumes, among other things, the task of assuring that the elongated units 1 are installed in the device housing safely against shaking. In the illustrated case, three elongated units 1 are provided. The holding element 7 is, in such case, embodied such that the elongated units 1 are, among other things, surrounded by seals. Applied to the ends of the screw-in elements 5 are screw-clamps 10, for effecting the electrical connections with the elongated units 1. For this purpose, bores 12 are provided in the screw-in elements. These bores 12 also facilitate the replacement of the elongated units 1. The screws 9 serve for fixing the holding element 7 in the device housing 13. The holding element 7 includes seals, which, among other things, have the task of insulating the individual, elongated units 1 electrically from one another, in order to prevent short-circuits.

FIG. 3 shows a cross section through the device housing 13 with installed holding element 7 and the elongated units 1 located therein. To be seen here is how the screws 9 secure the holding element 7 in the device housing 13. Housing 13 is embodied such that the coupling nut 3 is accommodated in a suitable recess. The installation sleeve 14—composed of coupling nut 3 and screw-in element 5—offers a sealing of the device against the medium. Another embodiment would be one in which the cutting ring 4 is fitted directly into the device housing, without a coupling nut 3. This would spare the coupling nut 3 and the O-ring 6, and e.g. a gap-less installation could be realized. In such case, the cutting ring 4 would then assume also a sealing function. Consequently, this embodiment would also mean the achievement, via the securement system of the invention, of an electrical, pressure-tight, pull-resistant securement, sealed against the medium and safe relative to rotation of the elongated unit 1. Since three elongated units 1 are installed and since the diameter of the elongated units is very small, e.g. in the millimeter range, while the length, however, can settle easily in the meter range, and since a stirring device can be present in the medium, a spacing piece 11 is provided between the elongated units 1, which are, in this embodiment, in the form of rods.

LIST OF REFERENCE CHARACTERS 1 elongated unit
2 smaller radius section of the elongated unit
3 coupling nut
4 cutting ring
5 screw-in element
6 O-ring
7 holding element
9 screw
10 screw-clamp 11 spacing piece
12 bore
13 device housing
14 installation sleeve
15 recess in the coupling nut
16 smaller radius section of the screw-in element

The invention claimed is:

1. A securement system for a measuring device for monitoring and/or determining the fill level of a medium in a container, having:
   at least one device housing;
   at least one elongated unit;
   at least one cutting ring; and
   an installation sleeve, wherein:
   said at least one cutting ring is situated in said at least one device housing;
   said installation sleeve is situated in said at least one device housing, surrounds said at least one cutting ring and a section of said at least one elongated unit and encapsulates the end of said at least one elongated unit situated in said at least one device housing;
   said installation sleeve includes a coupling nut and a screw-in element;
   said screw-in element is fashioned such that it accommodates a part of said at lest one elongated element;
   a section of said screw-in element is inserted into said coupling nut and screwed-in to said coupling nut;
   said at least one cutting ring cuts into the outer layer of the end of said at least one elongated unit far from the medium in such a manner that said at least one elongated unit is connected to said at least one device housing, pressure-tightly and resistantly against pull; and
   said at least one elongated unit is contacted electrically via said cutting ring.

2. The securement system as claimed in claim 1, wherein:
   the diameter of said at least one elongated unit is smaller than its length.

3. The securement system as claimed in claim 1, wherein:
   said at least one elongated unit is one of a rope, a cable, a rod or a tube.

4. The securement system as claimed in claim 1, wherein:
   in said coupling nut a recess is provided, such that an O-ring can be placed therein for the sealing.

5. The securement system as claimed in claim 1, wherein:
   said screw-in element and said coupling nut are fashioned and arranged in a manner such that they are connected releasably with one another.

6. The securement system as claimed in claim 1, wherein:
   said screw-in element is fashioned in a manner such that it is connected electrically with said cutting ring.

7. The securement system as claimed in claim 1, further having:
   a holding element in said at least one device housing in which said at least one elongated unit is secured.

\* \* \* \* \*